INVENTOR.
GERALD E. SOLBERG
BY Flehr, Hohbach, Test,
Albritton & Herbert
ATTORNEYS

United States Patent Office 3,504,460
Patented Apr. 7, 1970

3,504,460
CATENARY CABLE SUPPORT SYSTEM AND LOAD RELIEF COUPLING CONSTRUCTION THEREFOR
Gerald E. Solberg, San Carlos, Calif., assignor to Granger Associates, Palo Alto, Calif., a corporation of California
Filed Jan. 3, 1968, Ser. No. 695,494
Int. Cl. E04h *12/20;* F16g *11/00*
U.S. Cl. 52—98                                                4 Claims

ABSTRACT OF THE DISCLOSURE

A guyed tower supports a catenary cable from the upper end of the tower. In the supporting guy, two portions are joined by a load relief coupling construction comprised of a relatively inelastic link formed to include a zone of weakness adapted to break under an unusual force applied to the guy. The load relief element also serves to couple the two portions of the guy and is of a material subject to being relatively elongated under application of the unusual force applied to the guy. The load relief element receives the applied load of the guy upon rupture of the link. By elongation of the load relief element, the guy is adapted to elongate and thereby permit the upper end of the support tower to move and permit the catenary cable to increasingly sag and thereby reduce the load carried by the guy. A generally slack length of relatively inelastic cable also couples the two tandem portions of the guy in parallel function with both the link and the load relief element. The slack length of cable is dimensioned relative to the load relief element so as to become taut upon substantial maximum elongation of the load relief element so as to define a predetermined limit to the elongation permitted for the guy.

BACKGROUND OF THE INVENTION

This invention pertains to a catenary cable support system and to a load relief coupling construction therefor. This invention is particularly useful in providing support to antenna towers wherein a catenary cable is supported by the upper ends of the towers.

Where antennas are to be stationed in remote regions having severe environmental conditions, it is obviously desirable to minimize maintenance visits as much as possible, preferably to the point of their complete elimination.

Characteristically, however, many of these antennas are stationed in regions where wind and cold subject the antenna-supporting system to unusual applied forces resulting from icing of the antenna and tower members. The wind then acts upon an enlarged surface area and, along with the weight of the ice, applies severe forces to the tower guys.

Many tower guys must include, for electrical reasons, insulators spaced along each guy at predetermined intervals. These insulators characteristically constitute the weak points of the guys most subject to breakage.

The load on the guys can be kept relatively low to protect against destruction of the insulators by permitting the tops of the towers to move toward each other so as to increase the degree of sagging defined by the catenary cable or antenna cable carried, for example, by two towers.

Reduction of the load on the guys has the additional advantage of reducing the amount of concrete and excavation that must be required for the foundation of a given installation.

An unduly sagging antenna, however, while having the advantage of low guy loads, presents an unsightly and disconcerting appearance.

SUMMARY OF THE INVENTION AND OBJECTS

According to the present invention, an antenna system has been provided characterized by upstanding towers of a type held upright by guys wherein the towers support a catenary cable from the upper ends thereof. A cable coupling construction serves to couple two tandem portions of a tower support guy by means of a guy link formed to include a zone of weakness subject to being ruptured under an unusual force applied to the supported catenary cable. The zone of weakness serves to provide rupturing of the guy link in preference to other portions of the guy. A load relief element is adapted to couple the two tandem portions of the guy and is disposed, so that upon rupture of the link, the load relief element accepts the load carried by the guy. The load relief element is formed of a material subject to being relatively elongated under said acceptance of the load of the guy whereby the elongation of the load relief element and, consequently, also of the guy serves to permit the upper end of the support tower to move to permit the supported catenary cable to increasingly sag and thereby reduce the load applied to the guy.

Further, and in general, there is provided, in addition, a slack length of relatively inelastic cable coupling the two tandem portions of the guy in parallel function with both the link and the load relief element. The slack length of cable is dimensioned relative to the load relief element so as to become taut upon substantial maximum elongation of the load relief element so as to define a predetermined maximum limit to the elongation of the guy.

It is a general object of the present invention to provide an improved tower support system.

It is another object of the invention to provide a load relief element for permitting controlled elongation of a support guy.

These and other objects of the invention will become more apparent from the following detailed description when considered in conjunction with the drawings.

DESCRIPTION OF A PREFERRED EMBODIMENT

Figure 1:
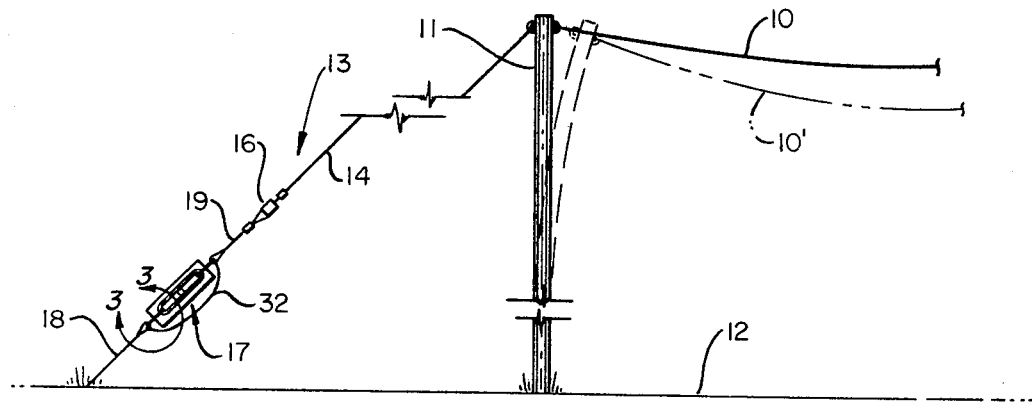
FIGURE 1 is a schematic view of a catenary cable support system and load relief coupling construction therefore, according to the invention.
Figure 2:
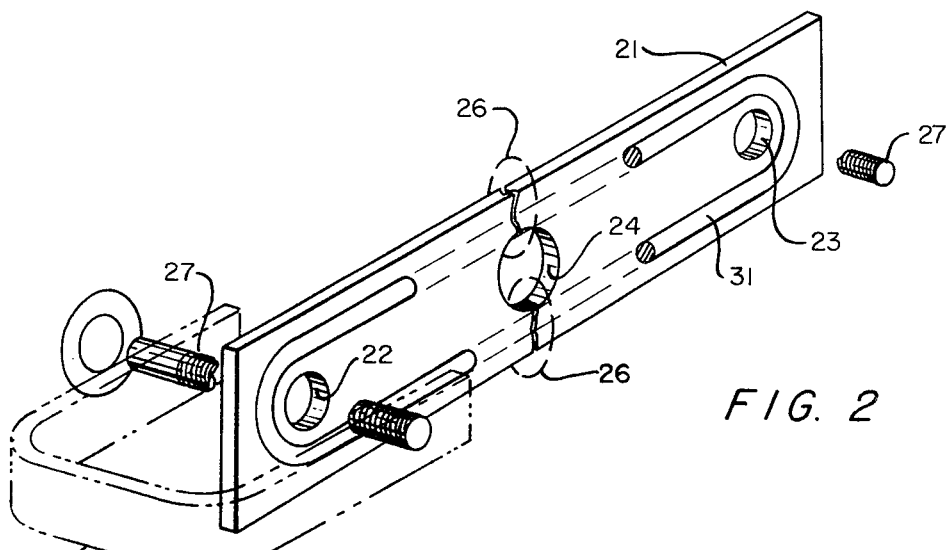
FIGURE 2 is a perspective view, in enlarged detail, showing a load relief coupling construction, according to the invention.
Figure 3:
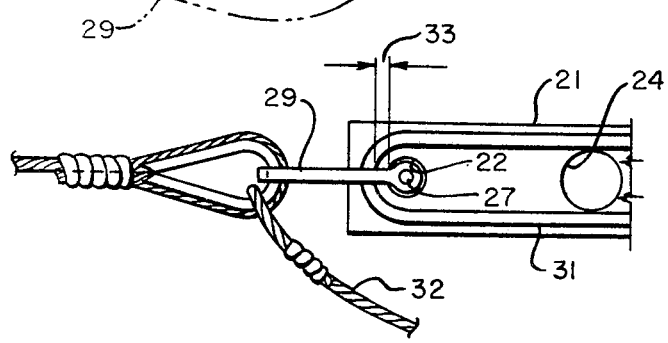
FIGURE 3 is a side elevation view, in enlarged detail, taken in the region 3—3 of FIGURE 1.

A catenary cable support system, of the kind described, is shown in FIGURE 1 wherein an antenna cable 10 is represented as secured to the upper end of a support tower 11 standing upright on a supporting surface, such as the earth 12. Tower 11 is maintained upright as by means, for example, of the guy assembly 13 comprised of a number of cable sections 14 connected together by means, for example, of insulators 16.

A load relief coupling assembly 17 serves to form a connection between tandem portions 18, 19 of one of cable sections 14.

Load relief coupling assembly comprises a link member 21 of generally uniform cross-section with the exception of a pair of shackle holes 22, 23 formed at its opposite ends and a relatively larger weakening opening 24 serving to define a zone of weakness 26 serving to provide the point of rupture or breakage of member 21 in preference to all other points in guy assembly 13.

Link member 21, for example, is preferably substantially one hundred percent (100%) aluminum, heat treated to yield substantially only at its ultimate strength so as to minimize stretching of member 21 for any appreciable degree before breaking. Thus, member 21 provides a relatively abrupt breakage when subjected to loads in excess of its strength. Member 21, when coupled by means such as the shackle pin 27 and shackle stirrup 29, affords a relatively inelastic coupling in guy assembly 13.

Means forming a load relief element adapted to couple the two portions 18, 19 of the cable section 14 coupled by link member 21 is formed by the annular element 31 carried alongside of link member 21 by shackle pins 27. Load relief element 31 is preferably formed of a material subject to being relatively elongated under acceptance of the load acting upon guy assembly 13 as will be transferred to element 31 upon rupture of link member 21. The elongation of load relief element 31 will thereby permit the overall elongation of guy assembly 13 so as to permit the upper end of tower 11 to move so as to permit the supported catenary cable 10 to increasingly sag, for example, to the position shown in phantom lines and represented by reference numeral 10'.

According to a particularly preferred construction, element 31 comprises a completely annealed aluminum rod material having a diameter on the order of $9/16$ of an inch and therefore provides a relatively ductile element adapted to be relatively elongated upon being subjected to the load carried by guy assembly 13 and link member 21. The elongation characteristic of element 31 over the full thirty inch length preferably should be on the order of at least fifteen percent (15%) so as to provide sufficient elongation of element 31 before all slack has been taken out of a guy extension limiter cable as described further below.

In supporting element 31 alongside link member 21, a slight clearance 33, for example, on the order of 1/4 of an inch has been provided whereby during normal use and under normal circumstances, link 21 carries the entire load of guy assembly 13. However, upon rupture of link member 21 at the zone of weakness 26, only a very minimum of free movement to the shackle pins 27 will be permitted before load relief element 31 is engaged by shackle pins 27. In this manner undue shock applied to element 31 is minimized.

Upon the gradual elongation and extension of relief element 31 under the foregoing conditions, it is readily apparent that ultimately element 31 will fail. In order to preclude total failure of element 31, a guy extension limiter cable 32 serves to couple the tandem ends of the cable portions 18, 19. Accordingly, the slack length of relatively inelastic cable 32 couples the two tandem portions 18, 19 in a parallel function with both the link member 21 and the load relief element 31. The slack length of cable is dimensioned relative to the load relief element 31 so as to become taut upon substantial maximum elongation of relief element 31 so as to thereby define a predetermined limit to the elongation of guy assembly 13.

From the foregoing, it will be readily evident that there has been provided a catenary cable support system and load relief coupling construction therefor whereby upon receipt by the catenary cable being supported of unusual and unanticipated loads, as may be caused for example by extreme icing and wind conditions, the upper ends of the support tower carrying the catenary cable will be permitted to move in by elongation of the supporting guys. This inward movement of the upper end of the support towers serves to relieve the load carried by the towers and, hence, relieve the load carried by the guys. Insulators disposed along the guys are thereby protected by virtue of the rupture of link members 21 at the zone of weakness so as to protect the insulators from damage. Ultimate elongation of the guy assembly 13 is limited as by means of the relatively inelastic slack length of cable 32.

I claim:

1. A normally inelastic guy assembly for supporting the upper end of an upstanding tower of a type held upright by guys, said guy assembly comprising two inelastic tandemly coupled portions, one of said portions including an inelastic cable and the other portion including an inelastic guy link coupled thereto at one end, inelastic means coupled to the other end of said guy link and adapted to be anchored to dispose the inelastic guy assembly between an upstanding tower and a support surface, said link being formed to include a predetermined zone of weakness subject to being ruptured under a predetermined abnormal force applied to said two portions, said zone of weakness serving to provide an abrupt rupturing of said link into separate parts in preference to elongation of other portions of the guy assembly, a load relief element also disposed in parallel functional relation with said link in couping said ineastic means and said cable portion, and serving, upon rupture of said link, to then accept the load carried by said guy assembly, said load relief element being formed of a ductile material subject to being relatively stretched under acceptance of said load, the stretching of said load relief element and elongation of the guy assembly being adapted to permit the cable portion to increasingly sag and thereby reduce the load applied to the guy assembly.

2. An inelastic guy assembly according to claim 1 further including a generally slack length of relatively inelastic cable coupling said cable portion and said inelastic means in parallel function with said link and said load relief element, said slack length of cable being dimensioned relative to said load relief element to become taut upon substantially maximum stretching of said relief element to thereby define a predetermined limit to the stretching of said guy.

3. In a catenary cable support system the combination comprising an upstanding tower of a type for supporting a catenary cable from the upper end thereof, a guy assembly anchored at one end and secured to hold the upper end of said tower against forces applied thereto by said catenary cable, said guy assembly including two tandem portions, a link serving a couple said portions one to the other and formed to include a zone of weakness subject to being ruptured under a predetermined force applied to the supported catenary cable, said zone of weakness serving to provide relatively abrupt rupturing of said link in preference to other portions of the guy assembly, a load relief element adapted to couple said two portions upon rupture of said link and to accept the load carried by said guy assembly, said load relief element being formed of a relatively ductile material to be readily elongated upon acceptance of said load to a degree to permit the upper end of said tower to move sufficiently to reduce the load from the catenary cable below a level adapted to terminate further elongation of said relief element, and a normally slack length of relatively inelastic cable coupled to said two portions in parallel function with said link and load relief element, said slack serving to accommodate rupture of said link and elongation of said relief element, and dimensioned to become taut upon substantial maximum elongation of said relief element.

4. In a cable support system according to claim 3 wherein said link is formed to include a substantially uniform cross-section transverse to the axis of the guy assembly, an opening formed through said link to locally reduce said cross-section to its minimum thereat and define said zone of weakness, said link being substantially non-stretchable prior to rupture thereof.

References Cited

UNITED STATES PATENTS

| | | | |
|---|---|---|---|
| 364,077 | 5/1887 | Addis | 52—146 |
| 768,005 | 8/1904 | Stone | 52—146 X |
| 775,335 | 11/1904 | LeHew | 52—149 X |
| 2,309,041 | 1/1943 | Booker et al. | 52—98 X |
| 2,471,166 | 5/1949 | Neff | 139—383 |
| 2,474,124 | 6/1949 | Schultz | |
| 3,049,194 | 8/1962 | Brendel | 52—149 X |

FRANK L. ABBOTT, Primary Examiner

PRICE C. FAW, Jr., Assistant Examiner

U.S. Cl. X.R.

52—148; 188—1